Nov. 22, 1927.	1,650,094
E. ROUČKA
AUTOMATIC REGULATOR OF THE RATE OF COMBUSTION IN BOILER
FURNACES OR GROUPS OF FURNACES
Filed Sept. 5, 1925
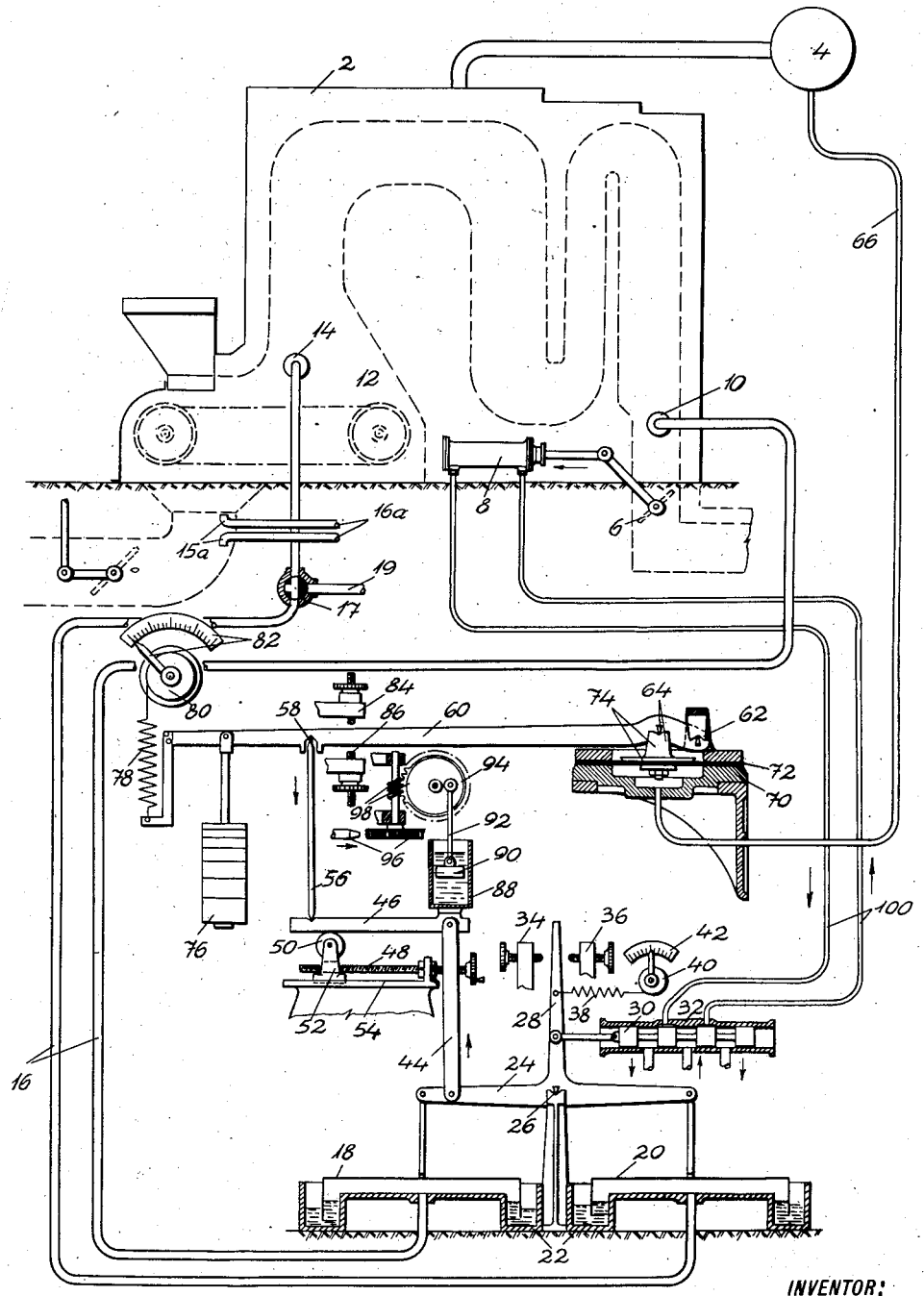
INVENTOR:
ERICH ROUČKA,
BY
Everett & Rook,
ATTORNEYS.

Patented Nov. 22, 1927.

1,650,094

UNITED STATES PATENT OFFICE.

ERICH ROUČKA, OF BLANSKO, CZECHOSLOVAKIA.

AUTOMATIC REGULATOR OF THE RATE OF COMBUSTION IN BOILER FURNACES OR GROUPS OF FURNACES.

Application filed September 5, 1925, Serial No. 54,842, and in Czechoslovakia September 27, 1924.

This invention relates to an automatic regulator for regulating the rate of combustion in steam boiler furnaces, one object of the invention being to provide a novel and improved automatic draught regulator, situated for example at the end of the heating surface of the boiler, or a regulator of the dynamic pressure difference depending on the air current in the furnace or on the flow of the combustion gases in the boiler, combined, for example by means of a set of levers, with a member which is sensitive to the steam pressure either in the common steam main or header, or in a pipe leading from a single boiler, or else to the steam pressure of the boiler itself. Such a member, sensitive to the steam pressure may be in the form either of a membrane or diaphragm, a movable piston or a float. A governor control attached to the device regulates a pressure medium in a pilot-motor which modifies the rate of combustion either by regulating the air admitted to the furnace, or by regulating the flow of the flue gases from the boiler. The manner in which the regulating is effected consists in that each steam pressure corresponds to a definite draught or a definite pressure difference. Both the steam pressure and the draught or pressure difference determine variable forces which tend to maintain the entire system in equilibrium, by means, for example of a set of weight or spring-loaded levers connecting the two systems which are sensitive to the values in question. In the event of a disturbance of the equilibrium the pilot-motor is set in operation by the governor and modifies the rate of combustion until the draught or pressure difference again restores the disturbed equilibrium of the device.

The regulator according to this invention is also applicable for the joint regulation of ranges or batteries of steam boilers in which case the draught is regulated, for example, in the common smoke flue or chimney stack. In certain instances, such a regulator may be advantageously used for regulating both single boilers and also a battery of boilers. In such event each boiler is provided with its own regulator, and the smoke flue common to several boilers, or the stack, is provided, if desired, with another regulator controlling the chimney draught. A variable value, operating in the direction of the steam pressure, said value consisting in either, for example, the draught at the end of the heating surface, or the dynamic pressure difference directly due to the flow of air in the furnace, or to the flow of the gases in the boiler flues, influences a corresponding float, or diaphragm membrane or movable piston. This value remains unchanged so long as the steam pressure determining said value remains unaltered. Said constant draught or constant pressure difference will be maintained, without regard to a change in the chimney draught, the resistance of the varying bed of fuel on the grate, the air temperature, the regulation of adjacent boilers, &c., that is to say, without regard to influences which cannot be predetermined or kept constant.

An embodiment of the regulator according to the invention is illustrated, diagrammatically, in the accompanying drawing.

The boiler 2 is one of a battery of boilers supplying steam to a common main 4. At the end of the heating surface of the boiler (behind an economizer) is situated a damper 6 regulating the boiler draught and therefore also the flow of the flue gases. This damper is adjusted by a pilot-motor 8, operated, for example, by oil under pressure. In front of the damper 6, a branch connection 10 opens into the flue, another branch connection 14 being arranged near the furnace 12; and the pressure difference, which varies in accordance with the rate of combustion, is transmitted through these branch connections and pipes 16 to the under-sides of two bells 18, 20, dipping into a sealing liquid in the vessels 22. Both bells 18, 20 are suspended from a balance beam 24 rockably mounted in bearings 26. An arm 28 connected to the balance beam 24 is connected on the one hand to the piston 30 of the governor 32 regulating the pressure medium in the pilot-motor 8 through pipes 100, and on the other hand the end of said arm coacts with adjustable stops 34, 36. The arm 28 is acted upon by the force of a spring 38, said force being adjustable by means of a tension device 40 and can be read off on a scale 42.

A connecting rod 44, conecting a lever 46 with the balance beam 24, is articulated to said balance beam. The lever 46 is supported on a roller 50, the position of which can be varied by means of a screw 48. This roller is mounted on a support 52, adapted to be displaced, according to requirements, in a guide 54 by means of the screw 48. At the other end of the lever 46 is a bearing for a thrust rod 56 engaging therewith by means of a knife edge, and engaging by means of a knife edge at its other end with a bearing 58 on a lever 60 adapted to swing in a bearing 62. By means of a knife edge and a bearing 64, the steam pressure transmitted from the common steam main 4 of the battery of boilers through a pipe 66, acts upon the lever 60. This pressure operates in a casing 70 and exerts pressure on a rubber membrane or diaphragm 72 carrying a plate and a pedestal 74 with the bearing 64. The lever 60 is loaded by a weight 76 operating against the steam pressure and the gas pressure difference in the device 18, 22, whilst a spring 78 enables the force exerted on the lever 60 by the weight 76 to be increased or decreased in small increments and gradually. The other end of the spring 78 can be adjusted at will by means of a self-checking tension device 80, and the effect of the adjustment can be easily read off by means of a scale and pointer 82. The thrust rod 56 acts in the direction of the action of the steam pressure upon the membrane 72, so that when the steam pressure falls, the force transmitted to the lever 46 through the thrust rod 56, increases. For certain purposes, the force of the thrust rod 56 operates against the steam pressure, a result which can easily be brought about by arranging for the lower bearing of the thrust rod 56 to be in position on the right of the rolling point of support 50 of the lever 46. This arrangement is employed with advantage where the rate of combustion is to be increased as the steam pressure rises, such as when the boiler is regulated by the steam pressure behind a Curtis wheel of a steam turbine, because this pressure increases with the load on the turbine. Stops 84, 86 limit the movement of the lever 60 in both directions. To the lever 46 is connected the cylinder 88 of a liquid brake in which a piston 90 dips with a small amount of play, which may be adjusted if desired. A connecting rod 92 of the piston 90 is eccentrically mounted on a crank disk 94, which is driven by a small turbine 96 (operated by the same pressure medium as the pilot-motor 8) through worm gear 98. This very small turbine (capacity about 1/100th to 1/1000th h. p.) drives the piston 90 about 60 to 200 strokes a minute, and has a low consumption. In this manner, the two sensitive members 72, 74 and 18, 20 and the lever mechanism with the piston 30 of the governor are set in slight oscillation, thereby securing great precision in the regulation. In operation of the regulator, assuming the demand for steam from the battery of boilers is suddenly increased, the steam pressure in the main 4 drops in consequence as the result of the increased pressure drop of the steam flowing through the pipe and also through the superheater, and the lever 60 moves in the direction of the stop 86. This movement is transmitted through the thrust rod 56, lever 46, and drawbar 44, to the lever 24 with the arm 28, and the control piston 30, and the pressure medium flows through the pipes 100, in the direction of the arrow, to and out of the pilot-motor. The damper 6 is thereby farther opened and the flow of the flue gases begins to increase. This increases the pressure difference between the branch connections 10, 14 and thereby also the force exerted by the floats 18 and 20 on the drawbar 44, in the direction opposite to that of the arrow. As soon as this force attains a certain value, determined by the withdrawal of the steam, the entire system returns to its original position, with the aid of the members connecting the floats 18, 20 with the lever 60. If the steam pressure increases, owing to a decrease in the load, the regulating operation is reversed. With constant steam pressure if the flow of the flue gases is affected by any external cause, such as increased resistance of the fuel on the grate to the passage of air, the regulating means also comes into operation in order to restore the previous state of pressure difference at the branch connections 10 and 14.

In boiler management it is essential that the flow of the flue gases should not fall below a certain minimum, even when the steam pressure increases further. This effect is produced by the invention, so that when the steam pressure exceeds the limit set by the weight 76 and the tension device 80, the lever 60 rises and the thrust rod 56 ceases to bear against it in the bearing 58, the result being to leave a certain amount of play between the bearing 58 and the end of the thrust rod 56. The regulator consisting solely of the members 18, 20, 24, 28, 30, 32 and 8 and the spring 38 with the tension device 40, 42 now operates in such a way as to continuously maintain the minimum flow of flue gases, or pressure difference between 10 and 14, which is adjustable at will by means of the spring 38 and tension device 40. The pressure at which the lever 60 ceases to act on the bells 18, 20 is determined by the tension of the spring 78, and weight 76 and thus also the limits for the steam pressure to be maintained by the regulators operating in parallel, are determined.

The adjustable roller 50 is for varying the control of the flue gas pressure difference to predetermine the minmum and maximum pressure difference which shall obtain for any given change in steam pressure. For example, the roller 50 may be adjustable over a scale (not shown) divided into millimeters water column per 1 atmosphere of steam pressure, and a decrease of 30 mm. W. C. in pressure difference may be empirically predetermined for an increase of 1 atmosphere in the steam pressure. Thus assuming the pressure difference to be 35 mm. W. C. at any given time, upon an increase of 1 atmosphere in the steam pressure the pressure difference will be 35 minus 30 or 5 mm. W. C. The roller 50 may be adjusted by the screw 48 so that the control of the flue gas pressure difference may be more or less sensitive for any given change in steam pressure.

By adjusting the roller 50, and if necessary by means of the tension device 80, the amount of steam to be supplied to the common stock by individual boilers can be fixed in advance. This enables different boilers in a range to be loaded individually in accordance with their characteristic for the time being. The arrangement may, for example, be such that at full load, a freshly cleaned or new boiler may be set to supply about 400% rating, whilst an old boiler supplies only 300% rating, and an old boiler shortly due for cleaning, perhaps not more than 150% rating. In this way the output capacity and economy of the heating plant can be utilized with precision. Such an arrangement, in combination with the corresponding bottom-draught regulator, and with a fuel feed and feed water regulator, will enable boilers to be run in a completely automatic manner.

In regulating a range or battery of boilers, the steam pressure for effecting such regulation will be drawn from a main common to the entire battery. Care should be taken that this point is properly selected with reference to the resistance to flow which the steam from all the boilers has to overcome. Hence, the points of connection on the pipe are chosen in such a way that the resistances to be overcome by the flow from the several boilers are distributed as uniformly as possible. By using a single bell 18, a definite flow at the end of the boiler can be regulated, especially in the case of boilers the furnaces of which are under balanced draught.

By means of the bells 18, 20 shown, the bottom or intake draught can be easily regulated, for example with a Pitot tube 15ª introduced into the current of bottom draught and connected by pipes 16ª to the respective bells 18 and 20 similar to the manner in which the branches 14 and 10 are connected to said bells.

Also, the regulator can be operated in accordance with the pressure of the flue gases at the branch 10 alone by placing a valve 17 in the pipe 16 connected to the bell 18 whereby the interior of said bell 18 may be opened to communication with atmosphere through pipe 19 and communication between said bell and branch 14 cut off.

While I have shown and described an automatic regulator embodying certain details of construction, it will be understood that this is primarily for the purpose of illustrating the principles of the invention and that details of the regulator may be modified and changed by those skilled in the art without departing from the spirit or scope of the invention. Therefore, I do not desire to be understood as limiting myself except as required by the following claims when construed in the light of the prior art.

Having thus described the invention, what I claim is:

1. A steam boiler regulating system, comprising means movably sensitive to the steam pressure, means movably responsive to variations in the draught, means including a lever system for operatively connecting said sensitive means with said responsive means so as to be actuated by both said sensitive means and said responsive means, balancing means cooperating with said lever system to establish equilibrium when a certain relation between the draught and the steam pressure obtains, means for varying the flow of flue gases through the boiler furnace, a governor for the last-mentioned means operatively connected to the third-mentioned means and actuated by cooperation of the four first-mentioned means, and means for varying the leverage of said lever system so as to predetermine the extent of the variation in the draught upon a certain change in steam pressure.

2. A steam boiler regulating system, comprising means movably sensitive to the steam pressure, means movably responsive to variations in the draught, means including a lever system for operatively connecting said sensitive means with said responsive means so as to be actuated by both said sensitive means and said responsive means, balancing means cooperating with said lever system to establish equilibrium when a certain relation between the draught and the steam pressure obtains, means for varying the flow of flue gases through the boiler furnace, and a governor for the last-mentioned means operatively connected to the third-mentioned means and actuated by cooperation of the four first-mentioned means, said lever system having a variable fulcrum changes in the position of which regulates the extent of variation in the draught upon a certain change in steam pressure.

3. A steam boiler regulating system, comprising means movably sensitive to the steam pressure, means movably responsive to variations in the draught, means for producing cooperation of said two means by which each is influenced by the other, balancing means cooperating with the last-mentioned means to establish equilibrium when a certain relation between the draught and the steam pressure obtains, means for varying the flow of flue gases through the boiler furnace, a governor for the last-mentioned means actuated by the third-mentioned means, and an adjustable spring means for exerting an additional force upon the third-mentioned means to predetermine the limits for the steam pressure to be maintained.

4. A steam boiler regulating system, comprising means movably sensitive to the steam pressure, means movably responsive to variations in the draught, means for producing cooperation of said two means by which each is influenced by the other, balancing means cooperating with the third-mentioned means to establish equilibrium when a certain relation between the draught and the steam pressure obtains, means for varying the flow of flue gases through the boiler furnace, and a governor for the last-mentioned means actuated by the third-mentioned means, the third-mentioned means being constructed to interrupt cooperation of the first two-mentioned means when a certain steam pressure is attained so that the rate of flow of flue gases is not affected by further changes in the steam pressure in the same direction.

5. A steam boiler regulating system, comprising means movably sensitive to the steam pressure, means movably responsive to variations in the draught, means for producing cooperation of said two means by which each is influenced by the other, balancing means cooperating with the third-mentioned means to establish equilibrium when a certain relation between the draught and the steam pressure obtains, means for varying the flow of flue gases through the boiler furnace, and a governor for the last-mentioned means actuated by the third-mentioned means, the third-mentioned means including separable parts certain of which are connected to the first-mentioned means and others to the second-mentioned means and said separable parts being disconnected when a certain steam pressure is reached so that further change in steam pressure in the same direction does not affect the draught.

6. A steam boiler regulating system, comprising means movably sensitive to the steam pressure, means movably responsive to variations in the draught, means for producing cooperation of said two means by which each is influenced by the other, balancing means cooperating with the third-mentioned means to establish equilibrium when a certain relation between the draught and the steam pressure obtains, means for varying the flow of flue gases through the boiler furnace, a governor for the last-mentioned means actuated by the third-mentioned means, the third-mentioned means including separable parts certain of which are connected to the first-mentioned means and others to the second-mentioned means and said separable parts being disconnected when a certain steam pressure is reached so that further change in steam pressure in the same direction does not affect the draught, and means cooperating with the separable parts connected to the second-mentioned means to exert an additional force thereon for regulating the rate of flow of flue gases at a predetermined minimum.

7. A steam boiler regulating system, comprising means sensitive to the steam pressure, means responsive to variations in the draught, means for producing cooperation of said two means whereby each influences the other, balancing means cooperating with the third-mentioned means to establish equilibrium when a certain relation between the draught and the steam pressure obtains, means for varying the flow of flue gases through the boiler furnace, a governor for the last-mentioned means actuated by cooperation of the four first-mentioned means, and means for producing vibrations in all of said means independently of the regulating movements thereof.

8. A steam boiler regulating system, comprising means movably sensitive to the steam pressure, means movably responsive to variations in the draught, means including a lever system for operatively connecting said sensitive means with said responsive means so as to be actuated by both said sensitive means and said responsive means, balancing means cooperating with said lever system to establish equilibrium when a certain relation between the draught and the steam pressure obtains, means for varying the flow of flue gases through the boiler furnace, a governor for the last-mentioned means operatively connected to the third-mentioned means and actuated by cooperation of the four first-mentioned means, and means for varying the leverage of said lever system so as to predetermine the extent of the variation in the draught upon a certain change in steam pressure, the third-mentioned means being constructed to be automatically relieved of influence from the first-mentioned means when a certain steam pressure is attained so that the rate of flow of flue gases is not affected by further changes in the steam pressure in the same direction.

9. A steam boiler regulating system, comprising means movably sensitive to the steam pressure, means movably responsive to variations in the draught, means including a lever system for operatively connecting said sensitive means with said responsive means so as to be actuated by both said sensitive means and said responsive means, balancing means cooperating with said lever system to establish equilibrium when a certain relation between the draught and the steam pressure obtains, means for varying the flow of flue gases through the boiler furnace, a governor for the last-mentioned means operatively connected to the third-mentioned means and actuated by cooperation of the four first-mentioned means, means for varying the leverage of said lever system so as to predetermine the extent of the variation in the draught upon a certain change in steam pressure, the third-mentioned means being constructed to be automatically relieved of influence from the first-mentioned means when a certain steam pressure is attained so that the rate of flow of flue gases is not affected by further changes in the steam pressure in the same direction, and means for exerting an additional force on said means responsive to draught to regulate the flow of flue gases at a certain minimum upon relief of said third-mentioned means from influence of the first-mentioned means.

10. The system set forth in claim 8 in which the last-mentioned means includes a liquid brake one part of which is connected to the lever system or one of said first two-mentioned means, and with the addition of means for continuously reciprocating the other part of said brake.

ERICH ROUČKA.